United States Patent
George et al.

(10) Patent No.: US 6,993,954 B1
(45) Date of Patent: Feb. 7, 2006

(54) SENSOR EQUILIBRATION AND CALIBRATION SYSTEM AND METHOD

(75) Inventors: Christopher George, Lynn, MA (US); Charles Malacaria, Medfield, MA (US)

(73) Assignee: Tekscan, Incorporated, South Boston, MA (US)

(*) Notice: Subject to any disclaimer, the term of this patent is extended or adjusted under 35 U.S.C. 154(b) by 0 days.

(21) Appl. No.: 10/899,790

(22) Filed: Jul. 27, 2004

(51) Int. Cl.
*G01G 19/56* (2006.01)

(52) U.S. Cl. ...................................................... 73/1.15
(58) Field of Classification Search ................... 73/1.15
See application file for complete search history.

(56) References Cited

U.S. PATENT DOCUMENTS

| | | |
|---|---|---|
| 2,478,938 A | 8/1949 | Osterhus |
| 2,818,726 A | 1/1958 | Almonette et al. |
| 2,951,817 A | 9/1960 | Myers |
| 3,349,489 A | 10/1967 | Shackelford |
| 3,386,067 A | 5/1968 | Costanzo |
| 3,503,031 A | 3/1970 | Nyhus et al. |
| 3,562,418 A | 2/1971 | Glusick et al. |
| 3,906,207 A | 9/1975 | Rivere et al. |

(Continued)

FOREIGN PATENT DOCUMENTS

DE 3631923 A1 3/1988

(Continued)

OTHER PUBLICATIONS

International Search Report, PCT/US20005/013693, filed Apr. 21, 2005.

(Continued)

*Primary Examiner*—Hezron Williams
*Assistant Examiner*—John Fitzgerald
(74) *Attorney, Agent, or Firm*—Wolf Greenfield & Sacks P.C.

(57) ABSTRACT

A system and method for equilibrating and calibrating a pressure or force sensor is provided. The system includes a flexible bag arranged to receive the sensor, and a vacuum source, connectable with the flexible bag, adapted to reduce the pressure within the flexible bag. By reducing the pressure within the flexible bag, such that the pressure inside of the bag is less than the pressure outside of the bag, the resultant uniform pressure acting on the sensor is used to calibrate and equilibrate the sensor. The system may include a porous material in the flexible bag to facilitate the evacuation of air from within the flexible bag as the pressure is reduced. The system may also include an opening, such that when the sensor is placed in the bag, a portion of the sensor extends outside of the bag to communicate with a controller. The opening may be provided either on the flexible bag, or on a clamp attached to the flexible bag. The system and method for calibrating and equilibrating a sensor may be employed to correct for sensor variations and/or to correlate sensor output to force or pressure.

50 Claims, 9 Drawing Sheets

U.S. PATENT DOCUMENTS

| | | |
|---|---|---|
| 3,944,740 A | 3/1976 | Murase et al. |
| 3,974,470 A | 8/1976 | Du Rocher |
| 3,992,212 A | 11/1976 | Youtsey et al. |
| 4,111,058 A | 9/1978 | Gross |
| 4,134,063 A | 1/1979 | Nicol et al. |
| 4,155,262 A | 5/1979 | Wong et al. |
| 4,163,204 A | 7/1979 | Sado et al. |
| 4,190,797 A | 2/1980 | Lecklider et al. |
| 4,203,648 A | 5/1980 | Seidler |
| 4,208,648 A | 6/1980 | Naumann |
| 4,213,348 A | 7/1980 | Reinertson et al. |
| 4,235,141 A | 11/1980 | Eventoff |
| 4,268,815 A | 5/1981 | Eventoff et al. |
| 4,276,538 A | 6/1981 | Eventoff |
| 4,301,337 A | 11/1981 | Eventoff |
| 4,306,480 A | 12/1981 | Eventoff |
| 4,314,227 A | 2/1982 | Eventoff |
| 4,314,228 A | 2/1982 | Eventoff |
| 4,315,238 A | 2/1982 | Eventoff |
| 4,319,078 A | 3/1982 | Yokoo et al. |
| 4,402,326 A | 9/1983 | Okano et al. |
| 4,426,884 A | 1/1984 | Polchaninoff |
| 4,433,223 A | 2/1984 | Larson et al. |
| 4,442,716 A | 4/1984 | Coe et al. |
| 4,451,714 A | 5/1984 | Eventoff |
| 4,483,178 A | 11/1984 | Miille |
| 4,488,873 A | 12/1984 | Bloomfield et al. |
| 4,492,949 A | 1/1985 | Peterson et al. |
| 4,495,236 A | 1/1985 | Obara et al. |
| 4,503,416 A | 3/1985 | Kim |
| 4,503,705 A | 3/1985 | Polchaninoff |
| 4,506,250 A | 3/1985 | Kirby |
| 4,518,833 A | 5/1985 | Watkins |
| 4,521,186 A | 6/1985 | Wodlinger et al. |
| 4,529,959 A | 7/1985 | Ito et al. |
| 4,555,953 A | 12/1985 | Dario et al. |
| 4,555,954 A | 12/1985 | Kim |
| 4,605,010 A | 8/1986 | McEwen |
| 4,634,623 A | 1/1987 | Watkins |
| 4,658,829 A | 4/1987 | Wallace |
| 4,684,563 A | 8/1987 | Hayashi et al. |
| 4,686,764 A | 8/1987 | Adams et al. |
| 4,695,963 A | 9/1987 | Sagisawa et al. |
| 4,732,042 A | 3/1988 | Adams |
| 4,733,553 A | 3/1988 | Folk et al. |
| 4,734,034 A | 3/1988 | Maness et al. |
| 4,771,638 A | 9/1988 | Sugiyama et al. |
| 4,781,056 A | 11/1988 | Noel et al. |
| 4,790,192 A | 12/1988 | Knecht et al. |
| 4,809,536 A | 3/1989 | Nishiguchi |
| 4,825,684 A | 5/1989 | Nishiguchi et al. |
| 4,856,317 A | 8/1989 | Pidorenko et al. |
| 4,856,993 A * | 8/1989 | Maness et al. ............ 433/68 |
| 4,862,743 A | 9/1989 | Seitz |
| 4,886,070 A | 12/1989 | Demarest |
| 4,996,511 A | 2/1991 | Ohkawa et al. |
| 5,010,774 A | 4/1991 | Kikuo et al. |
| 5,033,291 A | 7/1991 | Podoloff et al. |
| 5,060,527 A | 10/1991 | Burgess |
| 5,086,652 A | 2/1992 | Kropp |
| 5,086,785 A | 2/1992 | Gentile et al. |
| 5,088,503 A | 2/1992 | Seitz |
| 5,098,384 A | 3/1992 | Abrams |
| 5,131,259 A * | 7/1992 | Kropp ..................... 73/1.15 |
| 5,159,159 A | 10/1992 | Asher |
| 5,170,663 A | 12/1992 | Kovacevic |
| 5,181,522 A | 1/1993 | McEwen |
| 5,195,522 A | 3/1993 | Pytel et al. |
| 5,218,861 A * | 6/1993 | Brown et al. ............ 73/146.5 |
| 5,222,399 A | 6/1993 | Kropp |
| 5,237,879 A | 8/1993 | Speeter |
| 5,273,047 A | 12/1993 | Tripp et al. |
| 5,302,936 A | 4/1994 | Yauiger |
| 5,323,650 A | 6/1994 | Fullen et al. |
| 5,357,804 A | 10/1994 | Wesemann et al. |
| 5,361,133 A | 11/1994 | Brown et al. |
| 5,374,282 A | 12/1994 | Nichols et al. |
| 5,375,397 A | 12/1994 | Ferrand et al. |
| 5,408,873 A | 4/1995 | Schmidt et al. |
| 5,429,006 A | 7/1995 | Tamuri |
| 5,431,064 A | 7/1995 | Franz |
| 5,461,901 A | 10/1995 | Ottestad |
| 5,505,072 A | 4/1996 | Oreper |
| 5,515,711 A | 5/1996 | Hinkle |
| 5,515,738 A | 5/1996 | Tamuri |
| 5,541,570 A | 7/1996 | McDowell |
| 5,571,973 A | 11/1996 | Taylot |
| 5,583,303 A | 12/1996 | Franz |
| 5,612,876 A | 3/1997 | Zeidler et al. |
| 5,626,359 A | 5/1997 | Steffens, Jr. et al. |
| 5,665,899 A | 9/1997 | Wilcox |
| 5,678,448 A | 10/1997 | Fullen et al. |
| 5,731,754 A * | 3/1998 | Lee et al. ................. 340/447 |
| 5,736,656 A | 4/1998 | Fullen et al. |
| 5,756,904 A | 5/1998 | Oreper et al. |
| 5,799,533 A | 9/1998 | Seki et al. |
| 5,804,736 A | 9/1998 | Klauder et al. |
| 5,827,209 A | 10/1998 | Gross |
| 5,877,436 A | 3/1999 | Faust et al. |
| 5,905,209 A | 5/1999 | Oreper |
| 5,916,180 A | 6/1999 | Cundari et al. |
| 5,919,221 A | 7/1999 | Miesel |
| 5,957,491 A | 9/1999 | Cech et al. |
| 5,983,727 A | 11/1999 | Wellman et al. |
| 5,987,370 A * | 11/1999 | Murphy et al. ............ 701/45 |
| 5,989,700 A | 11/1999 | Krivopal |
| 6,006,386 A | 12/1999 | Mohaupt |
| 6,032,542 A * | 3/2000 | Warnick et al. ........ 73/862.627 |
| 6,038,935 A | 3/2000 | Fullen et al. |
| 6,041,659 A | 3/2000 | Wilda et al. |
| 6,101,436 A * | 8/2000 | Fortune et al. ............ 701/45 |
| 6,109,117 A | 8/2000 | Stanley et al. |
| 6,138,067 A | 10/2000 | Cobb et al. |
| 6,188,331 B1 | 2/2001 | Zee et al. |
| 6,223,606 B1 | 5/2001 | Burke et al. |
| 6,225,814 B1 | 5/2001 | Oreper et al. |
| 6,272,936 B1 | 8/2001 | Oreper et al. |
| 6,279,373 B1 | 8/2001 | Kenney et al. |
| 6,279,402 B1 | 8/2001 | Fisher |
| 6,289,747 B1 | 9/2001 | Billen et al. |
| 6,378,378 B1 | 4/2002 | Fisher |
| 6,430,475 B2 | 8/2002 | Okamoto et al. |
| 6,479,766 B2 * | 11/2002 | Gray et al. ................. 177/144 |
| 6,490,936 B1 * | 12/2002 | Fortune et al. ........ 73/862.581 |
| 6,531,951 B2 | 3/2003 | Serban et al. |
| 6,539,771 B1 | 4/2003 | Davidson et al. |
| 6,578,435 B2 | 6/2003 | Gould et al. |
| 6,601,432 B1 | 8/2003 | Ericson et al. |
| 6,629,445 B2 | 10/2003 | Yamanaka et al. |
| 6,640,611 B2 | 11/2003 | Ericson et al. |
| 6,661,239 B1 | 12/2003 | Ozick |
| 2002/0134592 A1 * | 9/2002 | Gray et al. ................. 177/208 |
| 2002/0152794 A1 | 10/2002 | Dietrich et al. |

FOREIGN PATENT DOCUMENTS

| | | |
|---|---|---|
| DE | 4237072 C1 | 12/1993 |
| EP | 0223355 | 5/1987 |
| EP | 0302385 B1 | 3/1993 |
| EP | 0694774 A1 | 1/1996 |
| EP | 1050057 B1 | 1/1999 |
| GB | 2115555 A | 9/1983 |
| GB | 2192186 A | 1/1988 |
| GB | 2372331 A1 | 8/2002 |

| | | | |
|---|---|---|---|
| JP | 56 142430 A | 11/1981 |
| JP | 58 182746 A | 10/1983 |
| JP | 61-207939 | 9/1986 |
| JP | 62 102127 A | 5/1987 |
| JP | 01 032138 A | 2/1989 |
| JP | A-2-158105 | 6/1990 |
| JP | 4012238 | 1/1992 |
| JP | 2001 066209 A | 3/2001 |
| JP | 2002 290362 A | 9/2002 |
| SU | 1364924 A1 | 1/1988 |
| WO | WO 94/15530 | 7/1994 |
| WO | WO 03/052368 A1 | 6/2003 |

OTHER PUBLICATIONS

Written Opinion of International Searching Authority, PCT/US20005/013693, filed Apr. 21, 2005.

Nasa Tech Brief "Pressure-Sensitive Resistor Material" for 1986 from JPL Invention Report NPO-16537/6043.

Spolet & Lippert "An Instrumented Shoe—A Portable Force Measuring Device" J. Blumechance, 1976, vol. 9, pp 779-783, Paragon Press.

S. Miyazaki & H. Iwakura, "Foot-force Measuring Device for Clinical Assessment of Pathological Gait", Medical & Biological Engineering & Computing, Jul. 1978, pp. 429-436.

www.aerovac.com/diagram.htm.
www.bondlineproducts.com/autovac.html.
www.membranepress.biz/bags/bags.aspx.
www.mercury-presses.com/htm/bags.shtml.
www.vacupress.com/products.htm.

* cited by examiner

SENSOR EQUILIBRATION AND CALIBRATION SYSTEM AND METHOD

FIELD OF THE INVENTION

The present invention relates generally to a system and method of standardizing a sensor, and more particularly to a system and method of equilibrating and calibrating a force or pressure sensor by placing the sensor in a relatively negative pressure environment.

DISCUSSION OF RELATED ART

Various types of sensors exist to measure and record forces or pressures on surfaces. One such sensor includes a plurality of sensor elements arranged on a substrate layer in some form of a pattern or matrix. Measurements obtained at each sensor element may be used to determine the force distribution across the surface.

Figure 1:
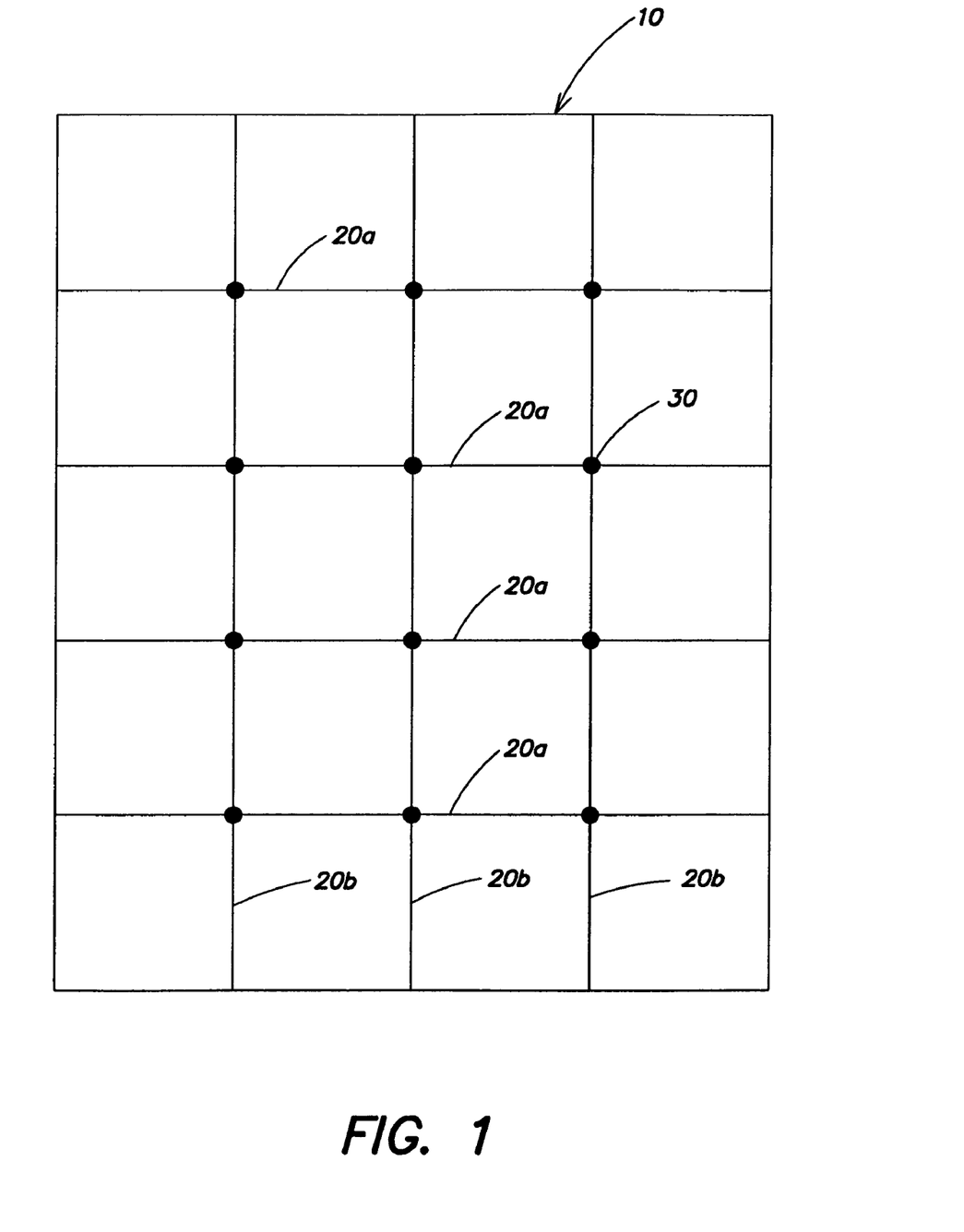
FIG. 1 is a diagrammatic representation of a portion of a conventional pressure sensor.

In particular, as shown in the exemplary sensor of FIG. 1, sensor 10 includes row and column electrodes 20a, 20b. To form the sensor elements 30, a pressure sensitive ink is deposited at the intersection of and between row and column electrodes 20a, 20b. Forces acting at the intersection cause a corresponding change in the electrical resistance of the pressure sensitive ink, which, by way of the column and row electrodes, is subsequently detected by a control circuit. This type of sensor is further described in commonly assigned U.S. Pat. No. 4,856,993, which is herein incorporated by reference in its entirety. Another example of a similar type of sensor is described in commonly assigned pending U.S. patent application Ser. No. 10/748,718, filed Dec. 30, 2003, which is also herein incorporated by reference in its entirety.

To maintain the measurement accuracy of a sensor having a plurality of sensor elements, the sensor may be standardized prior to use, wherein variations between sensor elements are accounted for (equilibration) and wherein the outputs of each sensor element is assigned a force or pressure value (calibration). In the equilibration step, a uniform pressure is applied to the sensor elements. With a perfect sensor under a uniform pressure, the resulting signal from each sensor element is identical. However, due to fabrication tolerances and/or handling of the sensor through general use, the sensor elements may not actually respond uniformly under a uniform pressure. Therefore, in the equilibration step, to assure that the sensor is capable of accurately measuring a force or pressure, any signal variations between the sensor elements under the application of a uniform pressure are detected. These detected signal variations are used to adjust the recorded local force or pressure acting on each sensor element, to compensate for any variations. In the calibration step, data from the sensor is obtained to convert the output signal of a sensor element into a force or pressure measurement. For example, if the sensor uses a pressure resistive material that varies as a function of the local pressure or force, such as the sensors described with reference to FIG. 1, the measured resistance at a sensor element is converted into the corresponding force or pressure with the data obtained during the calibration step.

Many conventional sensor calibration and/or equilibration systems apply pressure across a sensor by either mechanically applying a load across the sensor, or with the use of pressurized air. However, these systems typically include a large support structure, resulting in a heavy and/or cumbersome system. Examples of other arrangements to calibrate and/or equilibrate sensors are disclosed in U.S. Pat. No. 6,032,542 and U.S. Pat. No. 5,131,259, each of which is hereby incorporated by reference.

SUMMARY OF THE INVENTION

In one embodiment of the invention, a system for calibrating and/or equilibrating a force or pressure sensor is provided. The system includes a flexible bag which forms a chamber arranged to receive the sensor within, a vacuum source to reduce the pressure inside of chamber, and a controller arranged to communicate with the sensor. The controller is adapted to receive at least one signal from the sensor, representative of a force and/or pressure applied to the sensor upon application of external pressure acting on the sensor when the pressure within the chamber is reduced by the vacuum source.

Another embodiment of the invention is a method of calibrating and/or equilibrating a force or pressure sensor. A flexible bag is provided, and the sensor is placed within the bag. A first pressure, less than the pressure outside of the flexible bag, is applied within the bag, and a signal from the sensor, representative of a force or pressure applied to the sensor, is measured. The sensor is then removed from the bag.

In yet another embodiment of the invention, a system for calibrating and/or equilibrating a force or pressure sensor is provided. The system includes a flexible bag which forms a chamber arranged to receive the sensor within, a clamp cooperating with the flexible bag to seal the chamber, and a vacuum source adapted to reduce the pressure in the chamber. The system is further provided with instructions for calibrating and/or equilibrating the sensor by placing at least a portion of the sensor into the flexible bag, receiving at least one signal from the sensor, representative of a force or pressure applied to the sensor upon application of the pressure outside of the chamber acting on the sensor when the pressure within the chamber is reduced by the vacuum source.

In yet another embodiment of the invention, a system for calibrating and/or equilibrating a force or pressure sensor is provided. The system includes a flexible bag which forms a chamber arranged to receive the sensor. A porous material is disposed within the chamber and arranged to facilitate the evacuation of air in the chamber when the sensor is placed in the chamber and the pressure in the chamber is reduced to below atmospheric pressure.

Another embodiment of the invention is a method of calibrating and/or equilibrating a force or pressure sensor. A flexible bag is provided with a porous material disposed within the bag, and the sensor is placed inside of the bag, adjacent the porous material. A first pressure, less than the pressure outside of the bag, is applied while the porous material facilitates the evacuation of a gas within the flexible bag. The force and/or pressure applied to the sensor upon application of atmospheric pressure acting on the sensor is measured when the pressure within the bag is reduced by the application of the first pressure.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

Various embodiments of the invention will now be described, by way of example, with reference to the accompanying drawings, in which.

DESCRIPTION OF ILLUSTRATIVE EMBODIMENTS

Oftentimes, it is necessary to standardize a sensor prior to use. This may entail either or both equilibrating the sensor, such that sensors employing multiple sensing elements have substantially equal electrical signal outputs, and calibrating the sensor, where sensor output is correlated to the measured characteristic, e.g., force and/or pressure. It has been found that fabrication tolerances and/or general handling of the sensor may lead to sensitivity variations among sensor elements in a sensor leading to the need to standardize the sensor. However, as noted, prior art calibration and/or equilibration systems are cumbersome to use and not readily portable. Aspects of the present invention are directed to overcoming these shortcomings.

According to one aspect of the invention, the system for calibrating and/or equilibrating a sensor (such as that described above) includes a vacuum chamber in the form of a flexible bag, within which the sensor may be placed. A vacuum source, connectable to the flexible bag, is capable of reducing the pressure within the bag. Once the sensor is temporarily sealed in the bag, and as the pressure within the bag is reduced, the pressure outside of the bag begins to press down on the sensor, due to the pressure differential. Thus, a uniform pressure may be applied to the sensor within the bag to calibrate and equilibrate the sensor. Utilizing such a system is easier and less cumbersome than conventional systems which require the application of a mechanical load or pressurized air, and are thus heavier and bulkier systems.

As will be described in further detail below, the system may include a porous material placed within the flexible bag to facilitate air evacuation. The system may further include a releasable sealing clamp that cooperates to seal the flexible bag, thereby reducing outside air infiltration.

It should be appreciated that the method and system for calibrating and/or equilibrating a sensor described herein is not limited for use with any particular type of sensor. Thus, the system and method may be used to calibrate and/or equilibrate any type of sensor, such as resistive, capacitive, ultrasonic, and piezoresistive pressure and/or force sensors, etc. Further, the present invention is not limited to both equilibrating and calibrating, as the system may be employed to perform only one of these processes. Also, the system and/or method may be used to standardize (i.e., calibrate and/or equilibrate) pressure or force, as the present invention is not limited in this respect. Thus, the term "sensor", as used herein, may refer to a sensor configured to detect either force or pressure or both.

Figure 2:
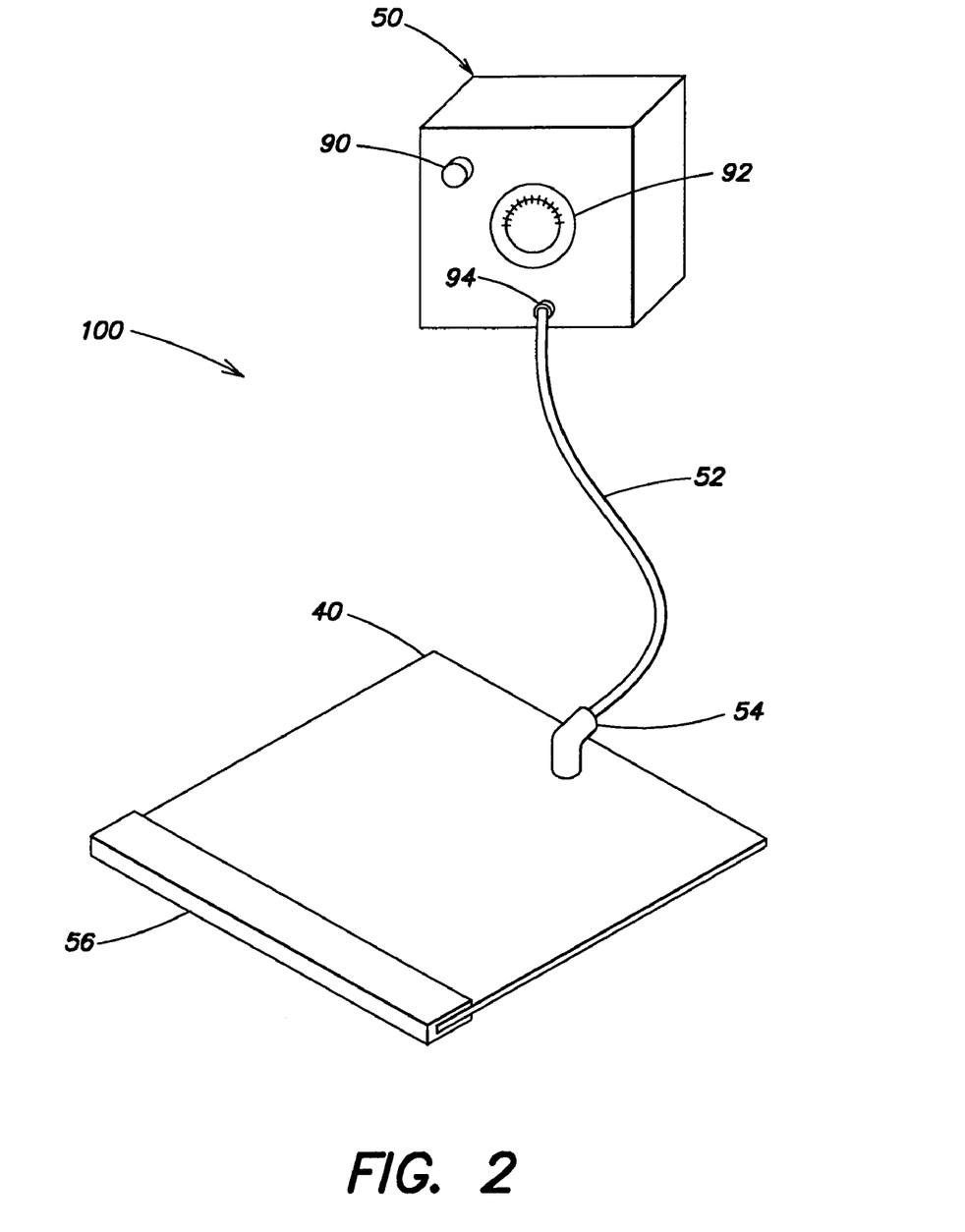
FIG. 2 is a diagrammatic perspective view of a system for equilibrating and/or calibrating a sensor.

Turning now to the drawings, and in particular with reference to FIG. 2, a sensor calibration and equilibration system 100 according to one aspect of the invention will now be described. The system 100 includes a flexible bag 40 and a vacuum source, such as vacuum pump 50, which as shown in FIG. 2 is connected to vacuum port 54 on the flexible bag 40 through conduit 52. In one embodiment, the vacuum source is an electric pump. Alternatively, a venturi pump may be employed, as the present invention is not limited in this respect. Conduit 52 may be any suitable coupling, such as a flexible hose, as the present invention is not limited in this regard. In the embodiment shown in FIG. 2, a resealable clamp 56 cooperates with the flexible bag 40, providing access to position a sensor within the bag, while also providing an arrangement to seal the bag.

The flexible bag 40 itself may be made of two thin plastic sheets 40a, 40b sealed on three sides, or the bag may consist of one thin sheet folded over onto itself. Further, in one embodiment, the bag 40 is made from a pair of urethane sheets which are RF welded on at least three sides. More generally, the flexible bag may be made of any conformable non-porous flexible material capable of forming a varying volume chamber within, as the present invention is not limited in this respect. The formed flexible bag may be rectangular-shaped, with dimensions of about 23 inches by about 24 inches.

Although the pressure within the chamber may be effectively reduced when only the sensor is in the bag, other pressure-reduction enhancing arrangements may be employed. In one embodiment, the system may also include a porous material 58 disposed in the flexible bag 40. As the vacuum source reduces the pressure, the porous material may act as a channel through which the air can flow out, thereby reducing the occurrence of any entrapped air in the chamber. It has been found that it may be advantageous to eliminate air pockets from inside the flexible bag 40, as their occurrence may disrupt the accuracy of the equilibration and/or calibration of the sensor.

Figure 3:
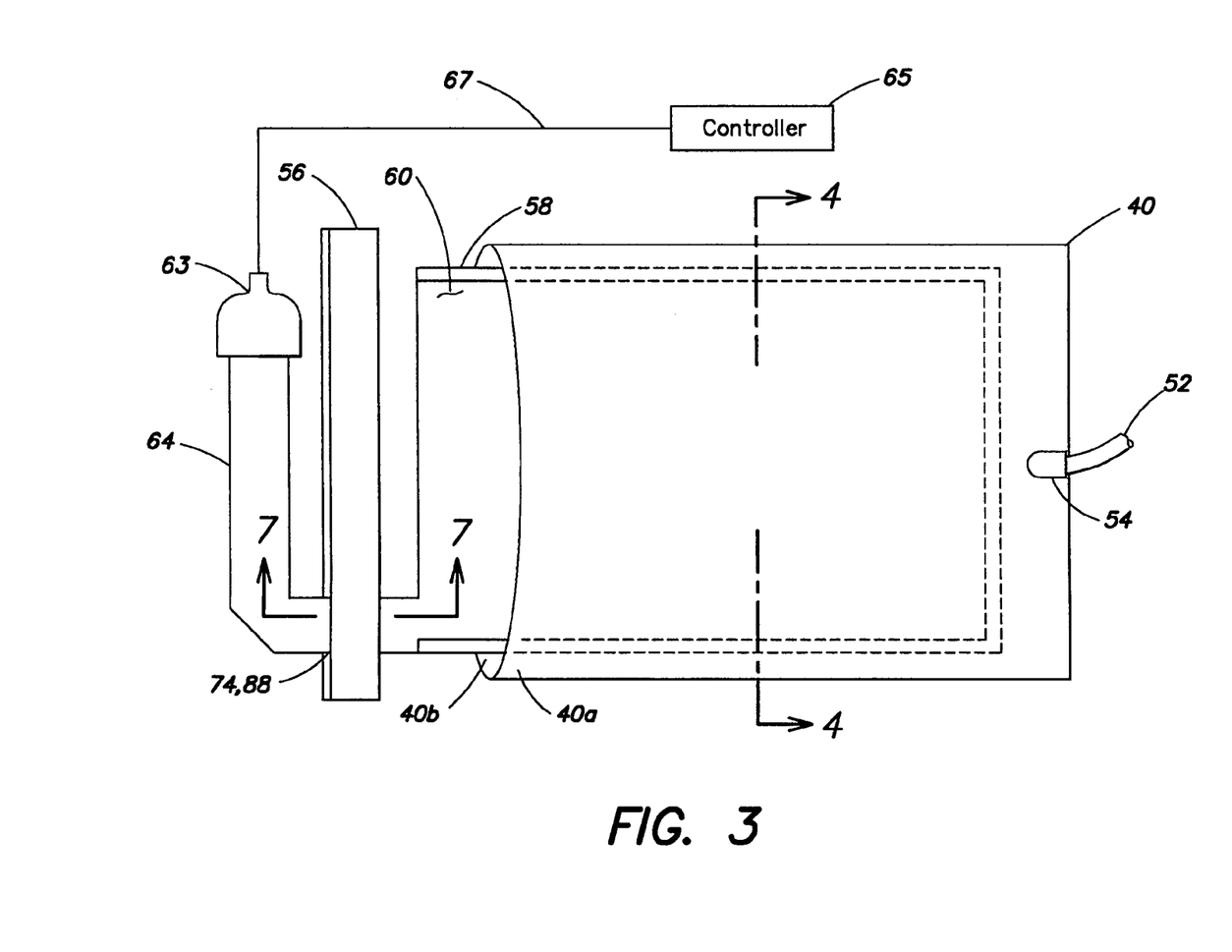
FIG. 3 is a top view of the system of FIG. 2, with a sensor partially within a chamber of the system.
Figure 6:
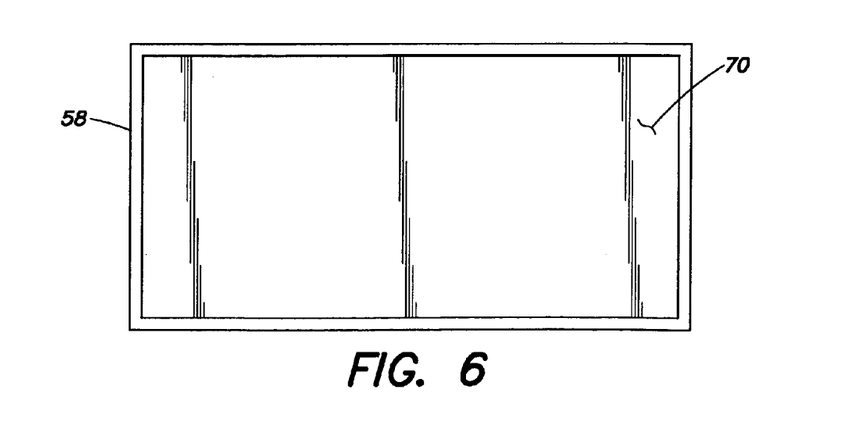
FIG. 6 is a top view of a portion of the system.

The porous material may extend along at least a portion of the perimeter of the sensor 60, as shown in FIG. 3, or it may extend completely around the perimeter of the sensor, as shown in FIG. 6, as the present invention is not limited in this respect. Further, the porous material may be arranged to extend just along the perimeter of the sensor 60, or all or portions of the porous material may extend under portions (such as at the sensor edge) or all of the sensor. The porous material 58 may be removable from or fixed within the flexible bag 40, as the present invention is not limited in this respect.

The porous, air permeable material can be formed of any suitable material, for example, foam, felt or other non-woven material, fabric, or solid material formed with air channels, or any combination thereof, as the present invention is not limited in this respect. The porous material may have any suitable length, width or thickness, as the present invention is not limited in this respect. In one embodiment, the porous material is less than about ½ inch thick. In another embodiment, the porous material is less than or equal to about ⅛ inch thick. In one embodiment, the porous material is less than about 2 inches wide. In another embodiment, the porous material is less than or equal to about 1 inch wide. In one embodiment, the length of the porous material is about equal to the length and/or width of the sensor.

In one embodiment as shown in more detail in FIG. 6, a base 70 may be positioned within the flexible bag. The base may be employed to support the sensor and in one embodiment, may be used to fix the porous material. The porous member may be attached to the base at its perimeter, such that the sensor can nest within at least some of the boundaries defined by the porous member. The base may be permanently installed in the flexible bag or may be removable. The base may be formed of any material, and in one embodiment, the base 70 is formed from a relatively thin polycarbonate material, as the present invention is not limited in this respect. In one embodiment, the base is less than about ⅛ inch thick. In another embodiment, the base is less than about 1/16 inch thick. In yet another embodiment, the base is less than about 1/32 inch thick. In still another embodiment, the base is less than about 1/64 inch thick. The base can be more than, substantially equal to or larger than the length and width of the sensor, as the present invention is not limited in this respect. In one embodiment, the base is rectangular shaped, with length and width dimensions of about 21 inches by about 23 inches.

In one embodiment a releasable sealing clamp 56 is positioned along an edge of the flexible bag 40 to seal the sensor within the bag. As described in more detail below, the clamp 56 may include an opening 74, 88 to allow a portion of a sensor 60 placed within the flexible bag 40 to extend outside of the bag 40, as illustrated in FIG. 3. The opening 74, 88 in the clamp 56 permits the sensor 60 in the sealed bag 40 to communicate with a controller 65, outside of the chamber 62, via sensor lead 64, connector 63 and communications cable 67. Controller 65 may be merely a data acquisition device (DAQ), or may include additional processing capabilities, as the present invention is not limited in this respect.

Figure 7:
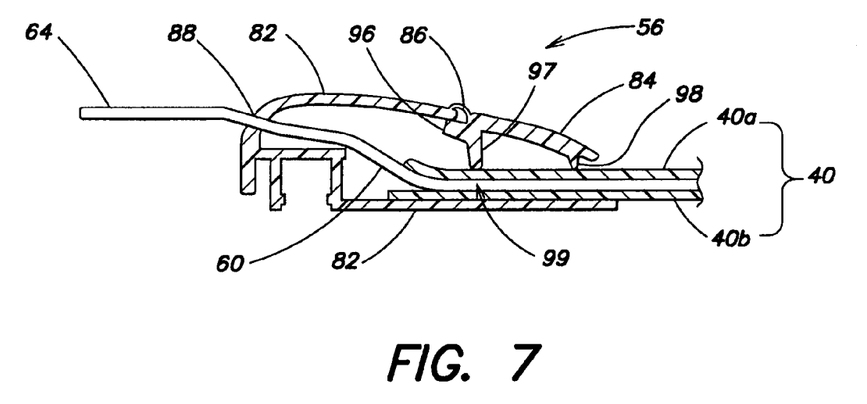
FIG. 7 is a cross-sectional view of the system taken along the line 7—7 of FIG. 3, showing a closure arrangement according to one embodiment.
Figure 8:
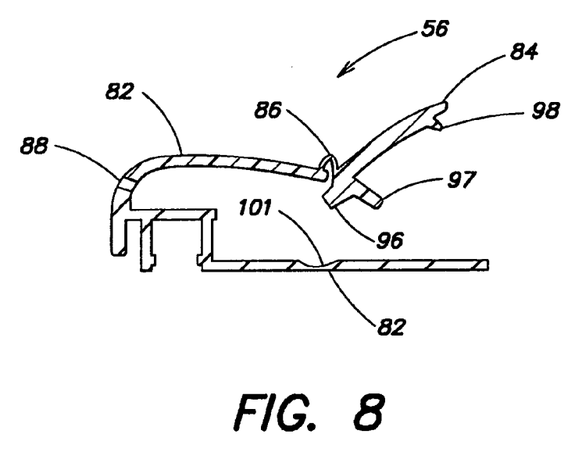
FIG. 8 is a cross-sectional view of the closure arrangement of FIG. 7 in an open position.
Figure 8A:
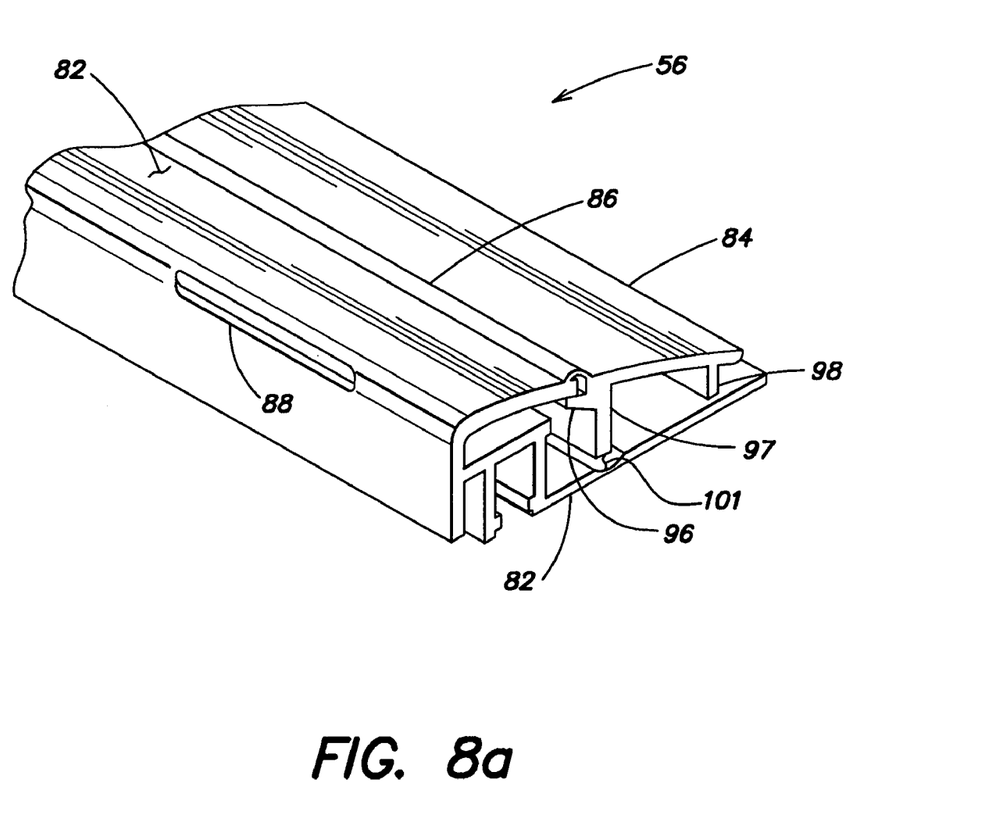
FIG. 8a is a perspective view of the closure arrangement of FIG. 7.

In one embodiment, the clamp 56 may include a hinged closure as shown in FIGS. 7–8, having a stationary bottom portion 82 and a pivotable top portion 84 that pivots at hinge 86. In one embodiment, the clamp, including top and bottom portions 82, 84, is formed of extruded plastic, wherein the hinge 86 is formed as a living hinge. However, it should be appreciated that the present invention is not limited in this respect, as the clamp 56 may be made from numerous other suitable materials, and may be formed utilizing other suitable manufacturing processes.

In the embodiment described with reference to FIGS. 7–8, the clamp 56 may include a plurality of projections 96, 97, 98. One or more of these projections may cooperate with the top and/or bottom portions to help to provide a snap-fit relationship as the top portion 84 rotates about hinge 86 into a closed position. A first projection 96 prevents further rotation as it abuts a surface of the bottom portion 82, as shown in FIG. 7. Second clamping projection 97 acts on the flexible bag to pinch it against the base portion 82 at location 99. A groove 101 (see FIG. 8) may be formed in the bottom portion 82 to receive the tip of the clamping projection. The flexible bag may be held between the tip and the groove. Third projection 98 may also act to prevent further rotation, as shown in FIG. 7. As illustrated, the clamp 56 may also include an opening 88 sized such that lead 64 of the sensor 60 can extend outside of the flexible bag to couple to a controller.

Figure 9:
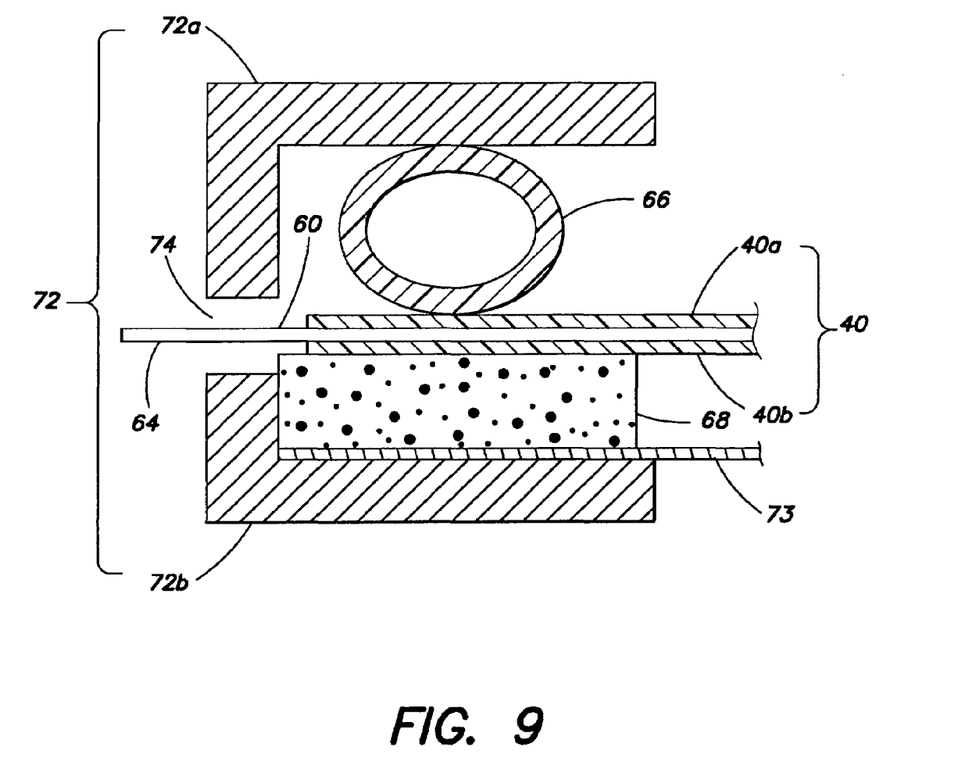
FIG. 9 is a cross-sectional view of a closure arrangement according to another embodiment.
Figure 9A:
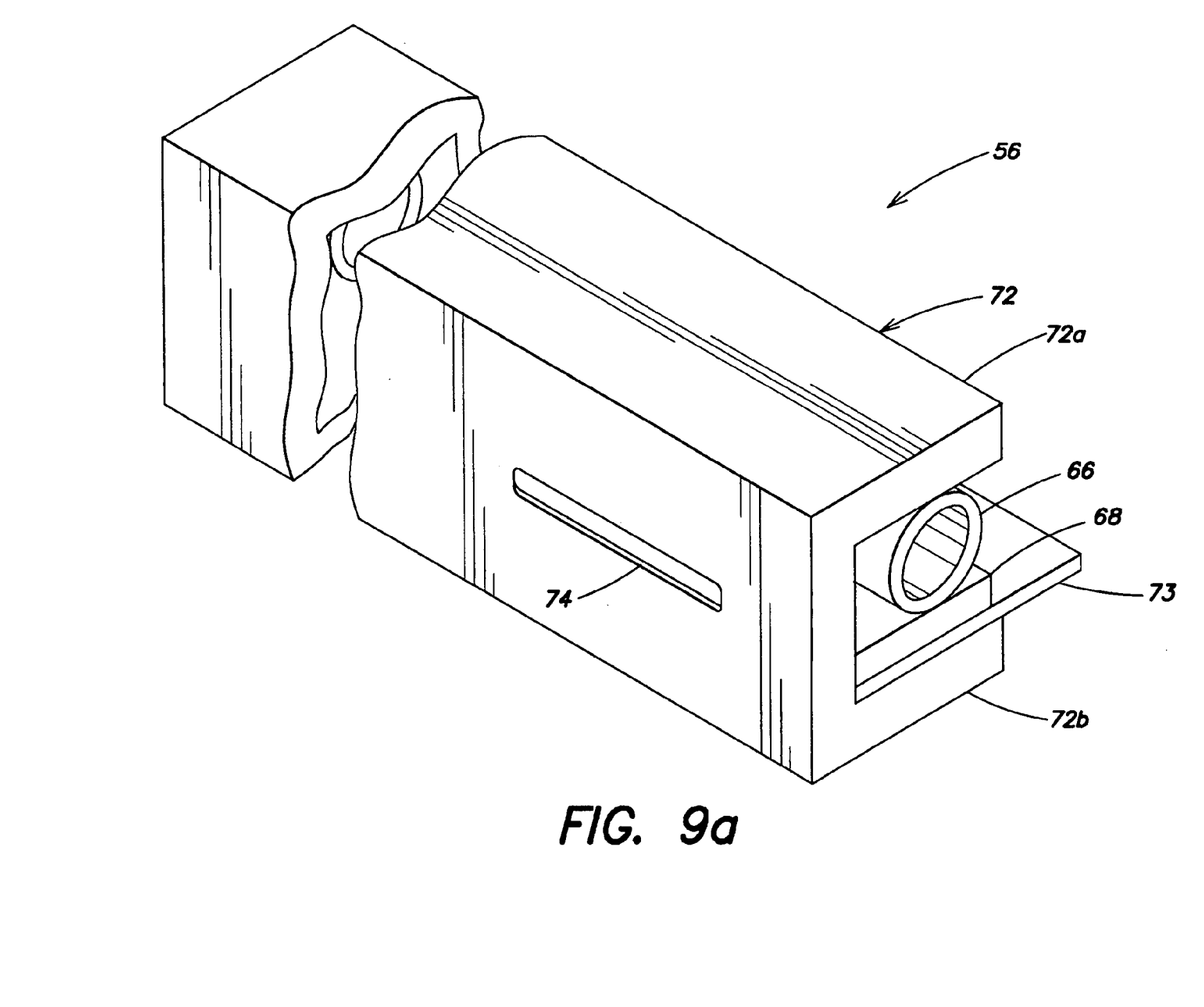
FIG. 9a is a perspective view of the closure arrangement of FIG. 9.

In another embodiment shown in FIG. 9, the clamp 56 is formed as a generally U-shaped fixed frame 72 having upper leg 72a and lower leg 72b and also having an opening 74 therethrough sized to allow a portion of the sensor 60 (such as sensor lead 64) to extend out from the bag. The frame may be formed of metal (such as aluminum), plastic or any other suitable material, as the present invention is not limited in this respect. To maintain an adequate seal around the opening 74, as well as to clamp the bag closed, biasing portions 66, 68 may be disposed within the clamp. The biasing portions 66, 68 may be any type of flexible member or biased clamp, as the present invention is not limited in this respect. In one embodiment, the biasing member 66 is formed of a flexible plastic material. In one embodiment, the upper member 66 is formed as a tubular material (although it may be formed with a solid cross-section) that is made of an elastomeric material. As shown, the upper member 66 is slightly compressed to impart a closing force on the flexible bag. In one embodiment, the upper member 66 may be inflatable to exert an outward pressure to further seal the bag. Upper member 66 may be removable to aid in inserting the lead through the opening 74 and to allow easier placement on the bag. In one embodiment, the lower member 68 is formed of a felt or felt-like material. Although the embodiment shown in FIG. 9 includes a lower member 68, it need not be included, as the upper biasing member 66 may press the flexible bag against the lower leg 72b directly.

In one embodiment, a lower support member 73 may be fixed between the lower leg 72b and the lower member 68. The lower support member 73 may act to further support the flexible bag when the clamp is secured thereto so as to reduce the chance that the bag will slip from the clamp. Of course, the present invention is not limited in this respect, as the lower support member 73 need not be employed. In one embodiment, the lower support member 73 is formed of a thin polycarbonate material, which may be similar to the base 70.

Although the above-described embodiments include the sensor lead extending through an opening in the clamp, the present invention is not limited in this respect, as the lead 64 may extend through a sealable opening in the bag 40. This opening may be made through either the top or bottom sheets 40a, 40b of the bag 40, or alternatively, the opening may be formed along an adjoining edge of the two layers. Further, in another embodiment, the sensor 60 is completely within the chamber 62 and there is no opening 74 in either the bag 40 or the clamp 56. In this embodiment, the controller may be either in the chamber 62 with the sensor 60, or the controller may be outside of the chamber 62, communicating with the sensor indirectly or remotely. In another embodiment, the bag 40 includes at least one opening to place the sensor within the bag, and another opening or port to enable the controller to communicate with the sensor in the bag. For example, the sensor may be placed inside of the bag through a resealable edge on the bag 40. A controller, through a USB cable for example, may connect to the sensor through the port.

Air within the chamber may be evacuated by any suitable means, as the present invention is not limited in this respect. In one embodiment, as illustrated in FIG. 2, a vacuum pump 50 is connected to the chamber. Although the present invention is not limited to any particular type of vacuum source, in one embodiment the vacuum source may be a conventional OEM vacuum pump with a 12 VDC connection. The vacuum pump 50 typically includes on its face a vacuum gauge 92, a relieving valve knob 90, and a quick disconnect receptacle 94.

As previously described, a controller 65 may be coupled to the sensor via lead 64 extending outside of the chamber 62 through opening 74 in the clamp 56, connector 63 and communications cable 67, as shown in FIG. 3. The controller receives signals from the pressure sensor 60 which are representative of the force or pressure applied to the sensor 60.

In one embodiment, the controller includes software which can detect and store the signals from the sensor elements 30 during the calibration and/or equilibration steps. Software adjustments may be made in view of any sensitivity variations found in the sensor elements during the equilibration step. In one embodiment, the calibration and/or equilibration data may be formatted into a chart, providing information specific to that particular sensor and/or sensor element. Further, the controller may be used after the sensor is removed from the calibration/equilibration system to detect and store signals while the sensor is in use. The calibration and/or equilibration data may also be transmitted to additional devices and/or controllers that are in communication with the sensor while the sensor is in use. For example, the sensor may be calibrated and/or equilibrated at one location, saving the data from the controller to a disk. The sensor data on the disk can easily be transported along with the sensor to a different location, such that the sensor may be used with its calibration and/or equilibration data.

The process for equilibrating and calibrating the sensor using embodiment(s) of the above described system will now be described. In one embodiment, the sensor is placed at least partially inside of the flexible bag. The flexible hose is coupled to the connector formed on the flexible bag and to the vacuum source. As explained above, a porous material 58 and/or a base 70 may also be included within the bag 40. A clamp 56 may be secured to the flexible bag 40 to substantially seal the sensor 60 within the chamber 62. In the embodiment shown in FIG. 3, a portion of the sensor 60, such as sensor lead 64, extends out of the chamber through opening 88 in the clamp 56. The sensor lead 64 may be connected to a controller to compute the pressure distribution based upon signals from the pressure sensor 60. Once the sensor 60 is secured within the chamber 62 and the clamp 56 is in its closed position, substantially sealing any openings 74, 88 and sealing the sensing portion of the sensor 60 within the bag 40, the vacuum source begins to reduce the pressure within the chamber 62, creating a pressure differential between the pressure inside and outside of the chamber. Since the pressure inside of the bag is less that the pressure outside of the bag, this differential pressure creates an applied pressure on the portion of the sensor placed within the bag.

As described above, the pressure applied to the sensor elements results in an output signal for each sensor element representative of the force applied at the location of that sensor element. Thus, the controller coupled to the sensor can now read the output of each sensor element to perform the equilibration and/or calibration of the sensor, as will be further described below. Because the sensor is now under a known uniform pressure, the sensor may be accurately equilibrated and calibrated.

Figure 4:
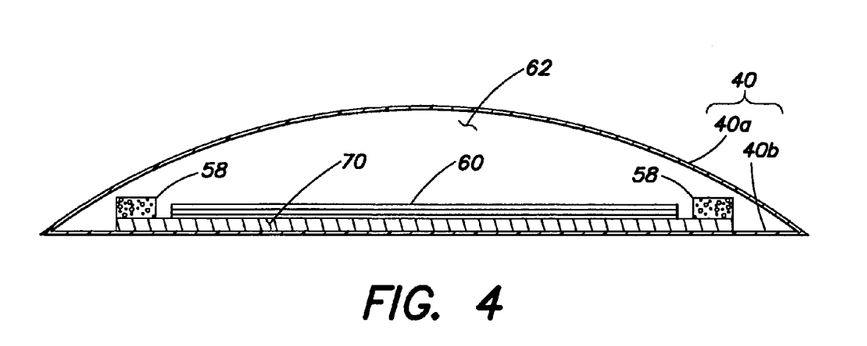
FIG. 4 is a cross-sectional view of the system taken along the line 4—4 of FIG. 3.

Prior to the application of the vacuum source to evacuate the air, the pressure within the chamber 62 (see FIG. 4) is substantially equal to the pressure outside of the chamber. In a typical environment, this equilibrium pressure is atmospheric pressure (~14.7 psi). However, the system of the present invention may also be used in a controlled environment where the pressure outside of the chamber is either higher or lower than atmospheric pressure. In either case, as the air is evacuated from the chamber 62, the outside pressure begins to act down onto the flexible bag 40 and the sensor 60 within, as indicated by arrows F in FIG. 5.

Figure 5:
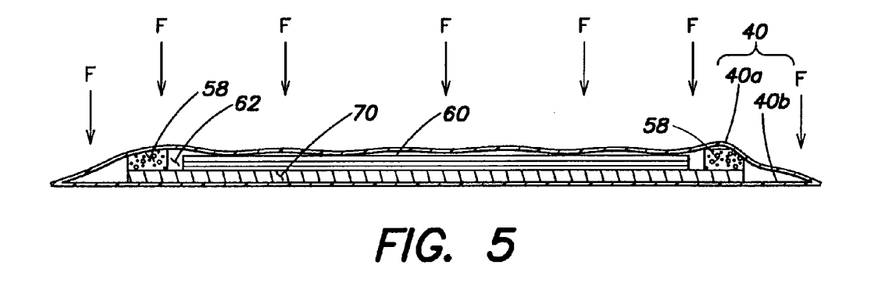
FIG. 5 is a cross-sectional view of FIG. 4, with reduced pressure within the chamber.

In one embodiment utilizing a vacuum pump 50, when the pump is first turned on, the pump purges a majority of the air within the chamber 62. This is immediately noticeable as the top sheet 40a of the bag collapses onto the bottom sheet 40b as seen in FIG. 5. Once this air is purged, the vacuum level in the chamber 62 rises to the desired level set with the relieving valve 90 (see FIG. 2). Depending on the desired pressure for the calibration and equilibration steps, the relieving valve 90 may be set to reduce the pressure within the chamber 62 such that it is a substantial vacuum (~0 psi). Alternatively, the relieving valve 90 may be set to maintain a pressure below atmospheric pressure, but greater than a substantial vacuum.

Once the air begins to evacuate from the chamber, it may be beneficial to delay the start of the equilibration or calibration process until the desired pressure within the chamber has reached it equilibrium state. Even though the vacuum gauge 92 may indicate a constant pressure within the chamber, since the gauge 92 is measuring the pressure in the pump 50, and the chamber 62 is separated from the pump 50 by conduit 52, there may be a short lag between the pressure reading at the gauge 92 and the actual pressure in the chamber 62. Therefore, a delay may be necessary to ensure that the pressure reading at the gauge 92 is representative of the pressure in the chamber 62.

As discussed above, during the equilibration step, a uniform pressure is applied to all of part of the sensor 60, and any variations between the respective sensor elements 30 may be detected and recorded based on the output signal from each of the sensor elements 30 under the uniform pressure. Each signal may further be compared to a collective average of the signals. This data is then used to determine a base line under a uniform pressure, to account for any variation in sensitivities among the respective sensor elements 30.

In the calibration step, the output signals from the sensor elements 30 are converted into equivalent force values. A calibration value is determined by the product of the total sensor area and the total pressure indicated by the pressure gauge 92 in terms of force. This calibration value can be stored and used to convert the output signals from the sensor elements 30 into local force values. For example, with a sensor 60 made with a pressure resistive material, the resistance, R, will decrease as a function of the force applied to the sensor element. Thus, the calibration value, which is equal to the total force on the pressure sensor 60, can be used to calculate the forces at each sensor element 30 based on the resistances at each sensor element.

When calibrating and/or equilibrating the sensor 60, it may be advantageous to conduct these steps while the sensor 60 is under a pressure that is similar to the pressure on the sensor while the sensor is in operation. In addition, if the sensor will be utilized under a wide range of pressures, it may be desirable to conduct the calibration and/or equilibration steps under at least two different pressure levels. This may help to account for errors, because, over a larger range of pressures, a pressure sensor may be behave in a non-linear nature.

Although the system 100 may be used to equilibrate and calibrate a sensor 60 under a large range of pressures, in one embodiment, the system 100 is used with a pressure sensor 60 that typically measures pressures that range between 0.5–5 psi. If the system 100 is used in atmospheric pressure (approximately 14.7 psi), it may be desirable to adjust the vacuum source to reduce the pressure within the chamber to within a range of about 9.7–14.2 psi, to calibrate and/or equilibrate this sensor. As discussed above, the pressure applied to the sensor within the chamber is roughly equal to the outside pressure minus the pressure inside the chamber. Thus, reducing the pressure within the chamber to between 9.7–14.2 psi will equate to an applied pressure on the sensor between 0.5–5 psi, which is desirable because that is the specified pressure range during operation of this sensor. As discussed above, it may be advantageous to calibrate and equilibrate this sensor at more than one applied pressure to ensure an accurate pressure distribution.

When atmospheric pressure is the uniform pressure acting outside of the chamber 62, the maximum differential pressure between inside and outside of the chamber is equal to atmospheric pressure (~14.7 psi). Therefore, in an uncontrolled environment, where the pressure outside of the chamber is substantially equal to atmospheric pressure, the system of the present invention is limited for use with pressures of up to approximately 15 psi. However, when atmospheric pressure is not a restriction, the system may be used to apply forces greater than atmospheric pressure. For example, if the system was placed in a high pressurized environment where the pressure is greater than atmospheric pressure, the system could be used to apply a pressure greater than 15 psi.

Figure 10:
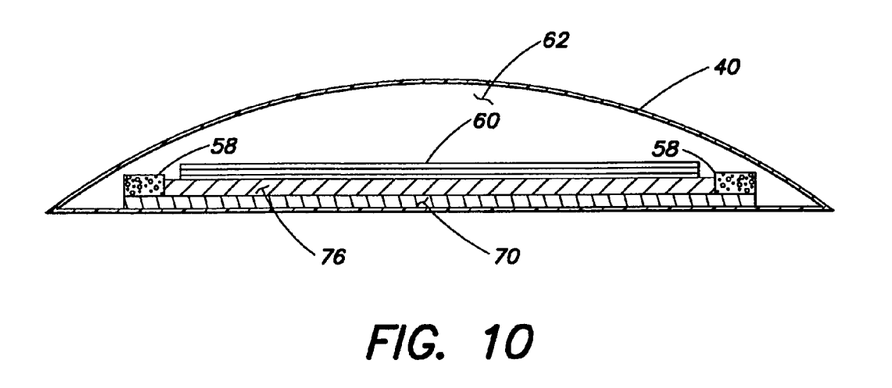
FIG. 10 is a cross-sectional view of the chamber according to another embodiment.

Depending upon the application of the sensor, in one embodiment, additional material may be placed in the chamber 62 to more accurately simulate the sensor environment when in use. For example, in FIG. 10, a cushion material 76 is placed in the chamber 62, positioned between the base 70 and the sensor 60. In this particular embodiment, the pressure sensor 60 is used to measure the pressure distribution across a seat cushion. Accordingly, this additional material helps to simulate the seat cushion. However, in another embodiment, the additional material may include fabrics, foams, plastics, etc, as the present invention is not limited in this respect. When utilizing such additional material, it is important to recognize that any additional material in the chamber may slow the process of evacuating the air within the chamber. Therefore, a longer time period, or lag time, may be necessary for the vacuum source to create a desired reduced pressure.

It should be appreciated that the present invention provides a method and system for calibrating and/or equilibrating a sensor without the use of large components and frames. The calibration and equilibration system of the present invention may be a portable system that fits into a travel bag. Depending on the material used to make the flexible bag 40, the bag may be rolled up into a compact travel form. In one embodiment, at least one of the bag 40, the porous material 58, the base 70, and cushion material 76 are flexible such that they can be rolled or folded up in a smaller configuration for storage or travel.

It should be understood that the foregoing description of the invention is intended merely to be illustrative thereof and that other embodiments, modifications, and equivalents of the invention are within the scope of the invention recited in the claims appended hereto. Further, although each embodiment described above includes certain features, the invention is not limited in this respect. Thus, one or more of the above-described or other features of the system or method, may be employed singularly or in any suitable combination, as the present invention is not limited to a specific embodiment.

What is claimed is:

1. A system for calibrating and/or equilibrating a force or pressure sensor, comprising:
   a flexible bag, forming a chamber within, the flexible bag constructed and arranged to receive the sensor;
   a vacuum source, connectable to the chamber, adapted to reduce the pressure in the chamber; and
   a controller constructed and arranged to communicate with the sensor placed within the chamber, wherein the controller is adapted to receive at least one signal from the sensor, representative of a force or pressure applied to the sensor upon application of external pressure acting on the sensor when the pressure within the chamber is reduced by the vacuum source so as to calibrate and/or equilibrate the sensor.

2. The system of claim 1, further comprising a porous material disposed within the chamber, the porous material constructed and arranged to facilitate evacuation of air from within the chamber as the pressure within the chamber is reduced.

3. The system of claim 2, wherein the porous material is constructed and arranged to extend at least partially around the outer perimeter of the sensor.

4. The system of claim 2, wherein the porous material comprises at least one of foam, felt or fabric.

5. The system of claim 1, further comprising a base disposed within the chamber, the base constructed and arranged to support the sensor when the sensor is within the chamber.

6. The system of claim 5, further comprising a porous material supported by the base, wherein the porous material is constructed and arranged to facilitate evacuation of air from within the chamber as the pressure within the chamber is reduced.

7. The system of claim 1, further comprising a clamp cooperating with the flexible bag.

8. The system of claim 7, wherein the clamp comprises an opening therethrough, such that when the sensor, having an electronic lead adapted to be coupled to the controller, is placed within the chamber, at least a portion of the electronic lead extends out of the chamber through the opening in the clamp, when the clamp is in a closed position.

9. The system of claim 1, in combination with the sensor, wherein the sensor comprises:
   at least one substrate layer; and
   a plurality of individual sensor elements operatively arranged with respect to the substrate layer.

10. The combination of claim 9, wherein the sensor further comprises at least one electronic lead adapted to be coupled to the controller.

11. The system of claim 1, wherein the flexible bag comprises at least two layers of a conformable non-porous material, wherein at least a portion of the two layers are sealed together.

12. The system of claim 11, wherein the two layers of non-porous material are formed from one folded-over piece of conformable non-porous material.

13. The system of claim 11, wherein the at least a portion of the two layers are welded together.

14. The system of claim 1, wherein the flexible bag further comprises at least one port adapted to communicate with the vacuum source.

15. The system of claim 14, wherein the vacuum source comprises a pump and conduit adapted to connect to the at least one port.

16. A method of calibrating and/or equilibrating a pressure or force sensor, comprising the steps of:
providing a flexible bag;
placing the sensor within the flexible bag to calibrate and/or equilibrate the sensor;
applying a first pressure within the flexible bag, wherein the first pressure is less than the pressure outside of the flexible bag;
measuring a signal from the sensor, representative of a force applied to the sensor upon application of the pressure outside of the bag acting on the sensor when the pressure within the flexible bag is reduced by the application of the first pressure, so as to calibrate and/or equilibrate the sensor under the first pressure; and
removing the sensor from the flexible bag.

17. The method of claim 16, wherein the sensor comprises at least one electronic lead, adapted to be coupled to a controller, the electronic lead constructed and arranged to transmit a signal from the sensor, representative of a force applied to the sensor, to the controller, and wherein the sensor is placed within the flexible bag such that at least a portion of the electronic lead is positioned outside of the flexible bag when the first pressure is applied within the bag.

18. The method of claim 16, wherein the sensor comprises a plurality of individual sensor elements, the method further comprising the steps of:
providing a controller constructed and arranged to communicate with the sensor, wherein the controller is adapted to receive at least one signal from the individual sensor elements representative of a force applied to the sensor elements; and
adjusting the output of at least one sensor element based upon the at least one signal from the sensor elements and the average of the signals from multiple sensor elements.

19. The method of claim 16, wherein the sensor comprises a plurality of individual sensor elements, the method further comprising the step of:
providing a controller constructed and arranged to communicate with the sensor, wherein the controller is adapted to receive at least one signal from the individual sensor elements representative of a force or pressure applied to the sensor elements; and
converting the output of at least one sensor element from a signal to a force or pressure, based upon the area of the sensor and the first applied pressure.

20. The method of claim 16, wherein the pressure outside of the flexible bag is atmospheric pressure.

21. The method of claim 16, wherein the first pressure is substantially a vacuum.

22. The method of claim 16, further comprising the step of:
providing a base disposed within the flexible bag, the base constructed and arranged to support the sensor when the sensor is in the flexible bag.

23. The method of claim 16, further comprising the steps of:
applying a second pressure within the flexible bag, wherein the second pressure is less than the pressure outside of the flexible bag; and
measuring a signal from the sensor, representative of a force applied to the sensor upon application of the pressure outside of the bag acting on the sensor when the pressure within the flexible bag is reduced by the application of the second pressure, so as to calibrate and/or equilibrate the sensor under the second pressure.

24. The method of claim 23, wherein the second pressure is less than atmospheric pressure but greater than the first pressure.

25. The method of claim 16, further comprising the step of:
providing a porous material disposed within the flexible bag, constructed and arranged to facilitate evacuation of air from within the flexible bag as the pressure within the flexible bag is reduced.

26. The method of claim 25, wherein the porous material is supported by a base, and wherein the porous material extends at least partially around the outer perimeter of the sensor.

27. The method of claim 16, wherein the sensor comprises an electronic lead, adapted to be coupled to a controller to transmit at least one signal from the sensor to the controller, the method further comprising the step of:
providing an opening into the flexible bag such that at least a portion of the electronic lead is positioned outside of the flexible bag while calibrating and/or equilibrating the sensor.

28. The method of claim 27, further comprising the steps of:
providing a clamp positioned on a portion of the flexible bag; and
securing the clamp in a closed position after the sensor is placed at least partially within the flexible bag.

29. The method of claim 28, wherein the opening is provided on the clamp, such that at least a portion of the electronic lead is positioned outside of the flexible bag, through the opening on the clamp.

30. A system for calibrating and/or equilibrating a pressure or force sensor, comprising:
a flexible bag, forming a chamber within, the flexible bag constructed and arranged to receive the sensor;
a clamp cooperating with the flexible bag, adapted to seal the chamber when the clamp is in a closed position;
a vacuum source, connectable to the chamber, adapted to reduce the pressure in the chamber; and
instructions for calibrating and/or equilibrating the sensor by placing at least a portion of the sensor into the flexible bag, and thereafter receiving at least one signal from the sensor, representative of a force or pressure applied to the sensor upon application of a pressure outside of the chamber acting on the sensor when the pressure within the chamber is reduced by the vacuum source.

31. The system of claim 30, in combination with the sensor, wherein the sensor comprises:
at least one substrate layer; and
a plurality of individual sensor elements operatively arranged with respect to the substrate layer.

32. The system of claim 30, further comprising a porous material adapted to be disposed within the chamber, the porous material constructed and arranged to facilitate evacuation of air from within the chamber as the pressure within the chamber is reduced.

33. The system of claim 30, wherein the clamp further comprises an opening therethrough, adapted to hold a portion of the sensor inside of the chamber and a portion of the sensor outside of the chamber when the clamp is in the closed position.

34. The system of claim 33, in combination with the sensor, wherein the sensor comprises:
- at least one substrate layer;
- a plurality of individual sensor elements operatively arranged with respect to the substrate layer; and
- at least one electronic lead adapted to be coupled to a controller, to transmit at least one signal from the sensor to the controller, and wherein at least a portion of the electronic lead extends out of the flexible bag, through the opening in the clamp when the clamp is in the closed position.

35. The system of claim 30, wherein the flexible bag further comprises at least one port adapted to communicate with the vacuum source.

36. The system of claim 35, wherein the vacuum source comprises a pump and conduit adapted to connect to the at least one port.

37. A system for calibrating and/or equilibrating a pressure or force sensor, comprising:
- a flexible bag, forming a chamber within, the flexible bag constructed and arranged to receive the sensor; and
- a porous foam material disposed within the chamber, the porous foam material constructed and arranged such that when the sensor is placed within the chamber and the pressure within the chamber is reduced to below atmospheric pressure, the porous foam material facilitates the evacuation of a gas within the chamber.

38. The system of claim 37, wherein the system is adapted to be rolled or folded into a smaller configuration for travel or storage.

39. The system of claim 37, in combination with the sensor, wherein the sensor comprises:
- at least one substrate layer; and
- a plurality of individual sensor elements operatively arranged with respect to the substrate layer.

40. The system of claim 37, further comprising a base disposed within the chamber, the base constructed and arranged to support the sensor when the sensor is within the chamber.

41. The system of claim 40, wherein the porous foam material is supported by the base, and wherein the porous material is constructed and arranged to extend at least partially around the outer perimeter of the sensor.

42. The system of claim 37, further comprising a clamp positioned along an edge of the flexible bag.

43. The system of claim 42, wherein the clamp comprises an opening therethrough, such that when the sensor, having an electronic lead adapted to be coupled to a controller, is placed within the chamber, at least a portion of the electronic lead extends out of the chamber through the opening in the clamp, when the clamp is in a closed position.

44. A method of calibrating and/or equilibrating a pressure or force sensor, comprising the steps of:
- providing a flexible bag;
- placing a porous material into the flexible bag;
- placing the sensor into the flexible bag adjacent the porous material, to calibrate and/or equilibrate the sensor;
- applying a first pressure within the flexible bag, wherein the first pressure is less than the pressure outside of the bag, and wherein the porous material facilitates the evacuation of a gas within the flexible bag; and
- measuring the force or pressure applied to the sensor upon application of atmospheric pressure acting on the sensor when the pressure within the bag is reduced by the application of the first pressure, so as to calibrate and/or equilibrate the sensor under the first pressure.

45. The method of claim 44, wherein the first pressure is substantially a vacuum.

46. The method of claim 44, wherein the pressure outside of the flexible bag is atmospheric pressure.

47. The method of claim 44, wherein the gas within the flexible bag is air.

48. The method of claim 44, further comprising the steps of:
- applying a second pressure within the flexible bag, wherein the second pressure is less than the pressure outside of the flexible bag and greater than the first pressure, and wherein the porous material facilitates the evacuation of a gas within the flexible bag; and
- measuring the force or pressure applied to the sensor upon application of the pressure outside of the bag acting on the sensor when the pressure within the bag is reduced by the application of the second pressure, so as to calibrate and/or equilibrate the sensor under the second pressure.

49. The method of claim 44, further comprising the step of:
- providing a base disposed within the flexible bag, the base constructed and arranged to support the sensor when the sensor is in the flexible bag.

50. The system of claim 49, wherein the porous material is supported by the base and extends at least partially around the outer perimeter of the sensor.

* * * * *